United States Patent
Sebastian et al.

(10) Patent No.: US 7,431,312 B2
(45) Date of Patent: Oct. 7, 2008

(54) BASKET

(75) Inventors: Marcos Alcala Sebastian, Zaragoza (ES); Maria Isabel Gimeno Verdejo, Zaragoza (ES); Jose Antonio Puertolas Salanova, Zaragoza (ES)

(73) Assignee: Araven S.A., Zarazoga (ES)

( * ) Notice: Subject to any disclaimer, the term of this patent is extended or adjusted under 35 U.S.C. 154(b) by 227 days.

(21) Appl. No.: 11/054,419

(22) Filed: Feb. 9, 2005

(65) Prior Publication Data

US 2006/0103087 A1    May 18, 2006

(30) Foreign Application Priority Data

Nov. 18, 2004    (ES) ................................ 200402780

(51) Int. Cl.
 *B62B 3/14*    (2006.01)
(52) U.S. Cl. .................. 280/33.998; 220/676; 206/515; 280/47.26
(58) Field of Classification Search ............... 190/18 A; 206/505, 512, 515, 519; 280/33.998, 47.26, 280/47.371, 79.2; 220/676, 485
See application file for complete search history.

(56) References Cited

U.S. PATENT DOCUMENTS

| | | | | |
|---|---|---|---|---|
| 1,689,448 A * | 10/1928 | Moynahan | ............... | 280/47.26 |
| 3,346,271 A * | 10/1967 | Parsons | ................. | 280/33.998 |
| 3,677,570 A | 7/1972 | Hedu | | |
| 4,185,848 A | 1/1980 | Holtz | | |
| 4,217,711 A | 8/1980 | Spresser et al. | | |
| 4,238,897 A | 12/1980 | Byers | | |
| 4,765,074 A | 8/1988 | Loos | | |
| 4,765,077 A | 8/1988 | Rosenthal et al. | | |
| 4,773,175 A | 9/1988 | Larsen | | |
| 4,805,331 A | 2/1989 | Boggess et al. | | |
| 4,871,209 A | 10/1989 | Handelman | | |
| 5,469,986 A * | 11/1995 | Jang | ........................... | 220/762 |
| 5,901,482 A | 5/1999 | Sawyer et al. | | |
| 5,988,334 A * | 11/1999 | Caruso | ..................... | 190/18 A |
| 6,079,720 A * | 6/2000 | Spear et al. | ............ | 280/47.371 |
| 6,116,390 A * | 9/2000 | Cohen | ....................... | 190/18 A |
| 6,179,176 B1 * | 1/2001 | Saggese et al. | ............. | 224/153 |

(Continued)

FOREIGN PATENT DOCUMENTS

EP            0 780 063        6/1997

(Continued)

OTHER PUBLICATIONS www.pfaffgroup.com.*

(Continued)

*Primary Examiner*—Christopher Ellis
*Assistant Examiner*—Katy Meyer
(74) *Attorney, Agent, or Firm*—Katten Muchin Rosenman LLP (57) ABSTRACT

Stackable basket (1) of those used in self-service shops and/or supermarkets, easy to use and adaptable to different users, that ensures the required hygiene when stacked and basically is provided, in addition to a conventional hinged handle, with a telescopic handle (5), a pair of wheels (11), two vertical L-shaped walls (15) that define corresponding small cubicles together with the side walls of the basket (1) so that when the baskets are stacked the wheels (11) of the basket placed above are located on the vertical projection of said cubicles, and with at least two through orifices (16) placed on the lower vertices of the basket.

18 Claims, 6 Drawing Sheets

U.S. PATENT DOCUMENTS

| | | | |
|---|---|---|---|
| 6,193,033 B1 | 2/2001 | Sadow et al. | |
| D440,020 S * | 4/2001 | Ronson et al. | D32/37 |
| 6,349,951 B1 | 2/2002 | Mogensen et al. | |
| 6,431,580 B1 * | 8/2002 | Kady | 280/655 |
| D486,619 S * | 2/2004 | Rivera et al. | D34/19 |
| D544,159 S | 6/2007 | McCoy et al. | |
| D546,511 S | 7/2007 | Luster et al. | |
| 2005/0087415 A1 * | 4/2005 | Gorga et al. | 190/115 |

FOREIGN PATENT DOCUMENTS

| | | |
|---|---|---|
| EP | 1 407 956 | 4/2004 |
| EP | 1407956 A1 * | 4/2004 |
| ES | 1 000 984 | 12/1986 |
| ES | 1 027 023 | 2/1994 |
| ES | 1 032 273 | 10/1995 |
| ES | 2 159 178 | 9/2001 |
| WO | WO 98/13269 | 4/1998 |

OTHER PUBLICATIONS

International Search Report and Written Opinion of the International Searching Authority dated Apr. 19, 2005.

* cited by examiner

BASKET

CROSS-REFERENCE TO RELATED APPLICATION

This application is claims priority from Spanish Patent Application Number 200402780 which was filed on Nov. 18, 2004, the contents of which are herein wholly incorporated by reference.

OBJECT OF THE INVENTION

This invention relates to an improved stackable basket of those used by customers in self-service shops or supermarkets, of the type that can be stacked on one another and are basically constituted by a single body with rounded edges of a strong plastic material that has a number of orifices or incuts and allows holding the products in it before they are placed on the checkout counter to pay for them.

The object of this invention is to provide a basket that, while maintaining a structure and composition that provide durability and reliability, can be easily handled and saves the user efforts resulting from carrying it when the items to purchase are contained in it, also providing it in addition to a normal handle with a telescopic handle that together with wheels fitted on its base allow carrying this basket as if it were a small cart, in a manner that is more comfortable and simple for the user regardless of his/her physical condition.

Also the object of this invention is to provide a system that at the time of stacking ensures the required hygiene without detriment to said stacking, by protecting the base of the basket on which the items rest from the dirt remains accumulated in the wheels of the basket that is fitted on top when the various baskets are stacked on one another.

BACKGROUND OF THE INVENTION

A large number of baskets are available in the market meant for use in supermarkets or self-service shops for customers to carry the items to the check-out boxes where they are paid for.

These baskets normally replace the conventional metal carts with wheels when no more are available, when the customer intends to purchase a small number of items that do not require using said cart or when the characteristics of the shop make it impossible to use said carts.

In these cases, the baskets conventionally used are embodied as containers generally made of lightweight yet strong plastic provided with one or more handles that allow the user to carry them about the premises and place the items in them. These handles are incorporated in the structure of the basket, so that they are not an obstacle when stacking them, as in the case of Utility Model U8601633, held by the present applicant, U9400303, U9502610, or application WO 98/13269.

However, this type of basket has the main drawback of having to be carried when placing a large number of items in it, which generally implies an excessive weight that can exceed 20 kilograms. This is not only uncomfortable for the user, particularly for the elderly, but also a safety problem as it can lead to injuries from overexertion or accidental impacts or falling items.

To solve this problem, baskets have been developed that on one hand allow stacking and on another a more comfortable use, as in the case of patent EP 1407956 relating to a basket which, in addition to the typical handles used to carry the basket in a known manner, has a traction handle and wheels allowing the basket to rest on the floor and be carried without having to lift it off the ground.

This system, although it solves the problem of the user having to lift the weight of the items, has significant drawbacks such as the handle size being determined by that of the basket, as it must be integrated in the frame do that stacking is not prevented, meaning that the handle will be the same for all users, or in other words that the length of this handle cannot be adapted to the height and physical characteristics of the user, so that for many users the handle will be too long or too short. In this way, if different baskets were manufactured to provide different handle lengths to adapt to various users, the dimensions of these baskets would be determined by those of the handle, as baskets with short handles for short customers must also be small to be able to house such a handle, while if baskets are made with longer handles for taller customers these will be larger. This would obviously imply the need to manufacture baskets with different sizes to satisfy the needs of different types of users, resulting in an excessive cost of the service.

These baskets also have an added drawback regarding the lack of hygiene. Indeed, the construction characteristics of the baskets mean that when they are stacked their wheels are housed in the area intended for the items of the basket immediately below, so that the dirt accumulated in the wheels and the shaft joining these as the basket is rolled on the supermarket floor will either be in contact with the inner base of the basket or will fall from the wheel or the shaft, ending on said base. The dirt in these baskets will result in their rejection by the users, as they will avoid using them when they are dirty in view of the type of products to be housed in them, generally food items.

DESCRIPTION OF THE INVENTION

The improved stackable basket disclosed solves the aforementioned drawbacks in an effective manner, allowing on one hand its convenient handling by all types of users and on the other maintaining their hygiene, which is not affected by stacking them.

To this end, the basket of the invention is provided on one hand with a telescopic handle that is perfectly collected and integrated in the basket structure in the resting position, so that it does not prevent stacking the baskets, and on the other hand is provided with internal walls or turrets placed on the base of each basket that are located on the vertical projection of the wheels of the basket placed above it in the stack, preventing the dirt in the latter from being deposited on the base of the baskets.

More specifically, the basket of the invention is provided on one hand with a conventional hinged handle that has not been shown, of the type which in a resting position lies on the basket's top frame and is integrated in it to facilitate stacking. As described above, this handle allows the user to carry the basket by lifting it, supporting its full weight.

In addition to this conventional handle is also provided a new telescopic handle which in the resting position is perfectly integrated in the basket body, facilitating its stacking. This telescopic handle is also provided with means allowing it to be fixed at its maximum length without retraction, this is, when it is fully extended, remaining fixed until a new user or the same one decides to retract it until it returns to its resting position.

The telescopic handle is preferably integrated on one of the side faces of the basket, abutting it inner or outer wall or even inside it, so that it does not interfere with the other conventional hinged handle.

It is also possible for the telescopic handle to have a folding segment, specifically on its free end, in which case the end bearing the grip will either rest on the notch or recess of the baskets upper frame or on the conventional handle, thereby allowing stacking.

The face bearing the telescopic handle also holds the wheels, more specifically on the bottom corners of this face, the other two bottom corners having legs or supports that form part of a peripheral rib that adds stability to the basket when it is set vertically on the ground, this is, in a resting position.

These wheels are preferably constructed without a common shaft connecting them, thereby eliminating the possibility of this shaft accumulating dirt collected while the basket rolls on the ground with the aid of the wheels, which would then fall on the basket below it when it is stacked.

On another hand, to preserve the hygiene of the baskets these are provided internally, at least at two of their corners and more specifically at those under which the wheels are located, with L-shaped internal walls or turrets that form a sort of cubicle with the walls of the basket meant to be located above the vertical projection of the wheels of the basket placed above it in the stack, so that the dirt deposited in this basket's wheels does not fall on the base of the basket below it but instead falls thorough said orifices or turrets towards a through orifice that is framed by the aforementioned walls and the basket sides.

These through orifices may be placed only on the vertices at which there is a wall or turret, or in all the vertices or the basket, in order to maintain hygiene when a user stacks a basket in an inverse position with respect to the other, so that if the wheels of the upper basket are not vertically aligned with the walls or turret of the lower basket the dirt from the wheels does not fall to the base of the lower basket but instead falls to the floor through said orifices.

The facts described above provide a stackable basket that is easily handled and comfortable for the user and guarantees the required hygiene.

DESCRIPTION OF THE DRAWINGS

To complete the description being made and in order to aid a better understanding of the characteristics of the invention, according to an example of a preferred embodiment, a set of drawings is accompanied as an integral part of the description where for purposes of illustration and in a non-limiting manner the following is shown.

PREFERRED EMBODIMENT OF THE INVENTION

In view of the described figures, it can be seen that the improved stackable basket (1) of the invention is basically constructed from a prism-shaped single body made of a strong material, such as plastic or the like, with a number of orifices or incuts (2) in all or some of its faces and with generally rounded edges.

As conventional baskets the improved stackable basket (1) of the invention is provided on its top part with a hinged handle 17 which in the resting position rests on the basket's upper frame or edge (3) and is integrated in it by a notch or incut (4) made in said edge (3) to facilitate stacking one tray on the other.

In addition to this conventional hinged handle, the basket (1) of the invention has a telescopic handle (5) with a corresponding handle (6). This handle (5) is place on one of the side faces of the basket (1), abutting its inner or outer wall or even inside it, and in general in the wall where it does not interfere with the conventional hinged handle.

The telescopic handle (5) can also have a folding segment, specifically its free end, in which case this end which includes the grip (6) will rest on either the notch or incut (4) of the top edge (3) or on the conventional handle, in order to allow stacking.

Specifically, in this example of embodiment as can be seen in FIGS. 1, 2, 5 and 6, the lateral telescopic segments (7) of the handle (5) run along the outer wall of the aforementioned face, this is, they travel along it by virtue of corresponding guide rails (8) along which run sliders (9) acting as stops provided in the bottom end of the corresponding telescopic segments (7), limiting the vertical displacement of the first portion of said telescopic segments (7) and preventing possible swivelling or lateral movement of the segments. Both the guide rail (8) and the sliders (9) acting as a stop are protected by two longitudinal protrusions (10) placed on either side of each rail (8) to prevent, in the case that the handle (5) is placed externally and therefore the sliders (9) jut out on the inside of the basket (1) as in the example of embodiment shown in the figures, that t items or packages introduced in the basket obstruct said rails (8), interfere with the aforementioned sliders (9) or damage them. Furthermore, these protrusions will prevent any object, such as the user's clothes, from obstructing said rails (8) when the handle (5) is placed internally and the sliders (9) jut outwards from the basket(1).

Figure 5:
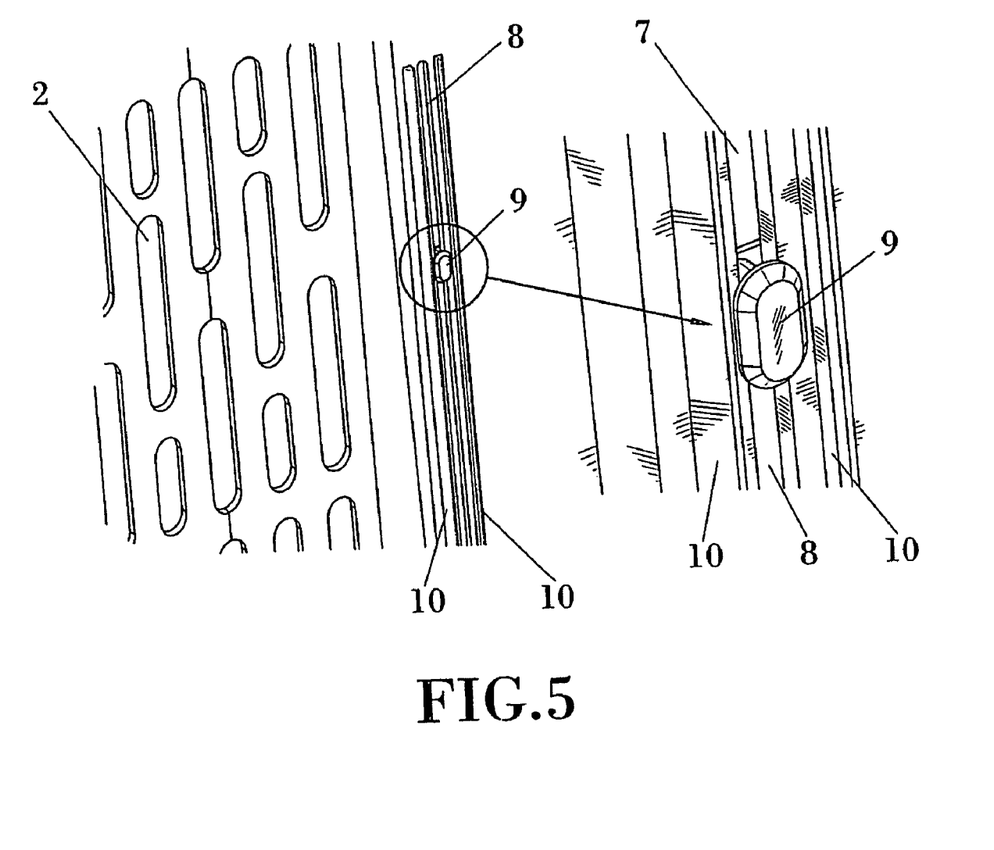
FIG. 5 shows a perspective view of one of the guides of the telescopic handle and a detail of this handle.

The telescopic handle (5) also has means that allow it to be fixed at a maximum height without retracting, i.e. when it is fully extended, remaining fixed until a user decides to fold said handle (5) to return it to its resting position, at which time it is fully integrated in the body of the basket (1), the grip (6) of said handle (5) being housed in the frame or edge (3) of the basket to facilitate stacking one basket on the other.

Figure 1:
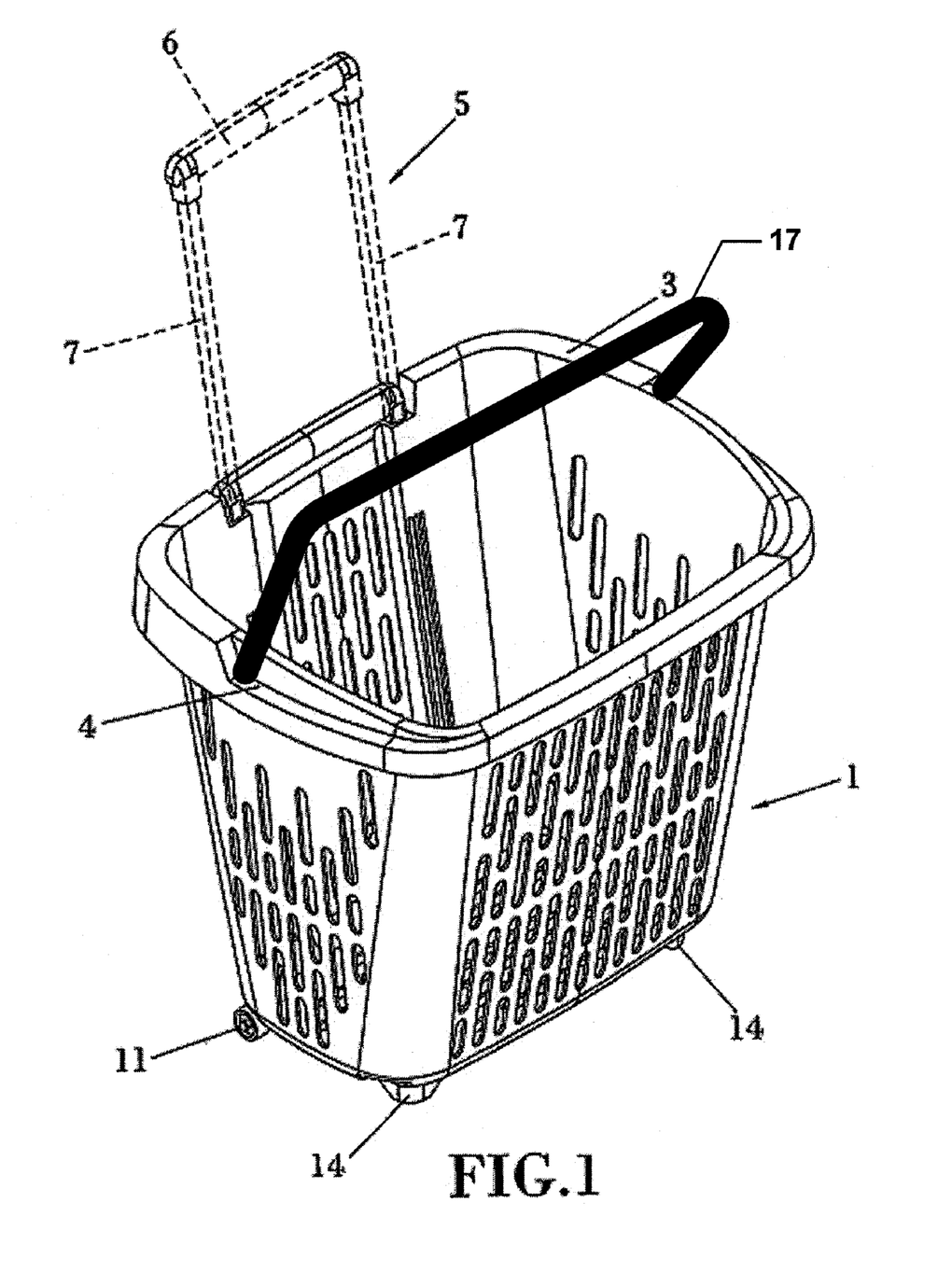
FIG. 1 shows an upper perspective view of the improved stackable basket showing the telescopic handle in two possible positions, as well as one of the wheels allowing to transport the basket.
Figure 2:
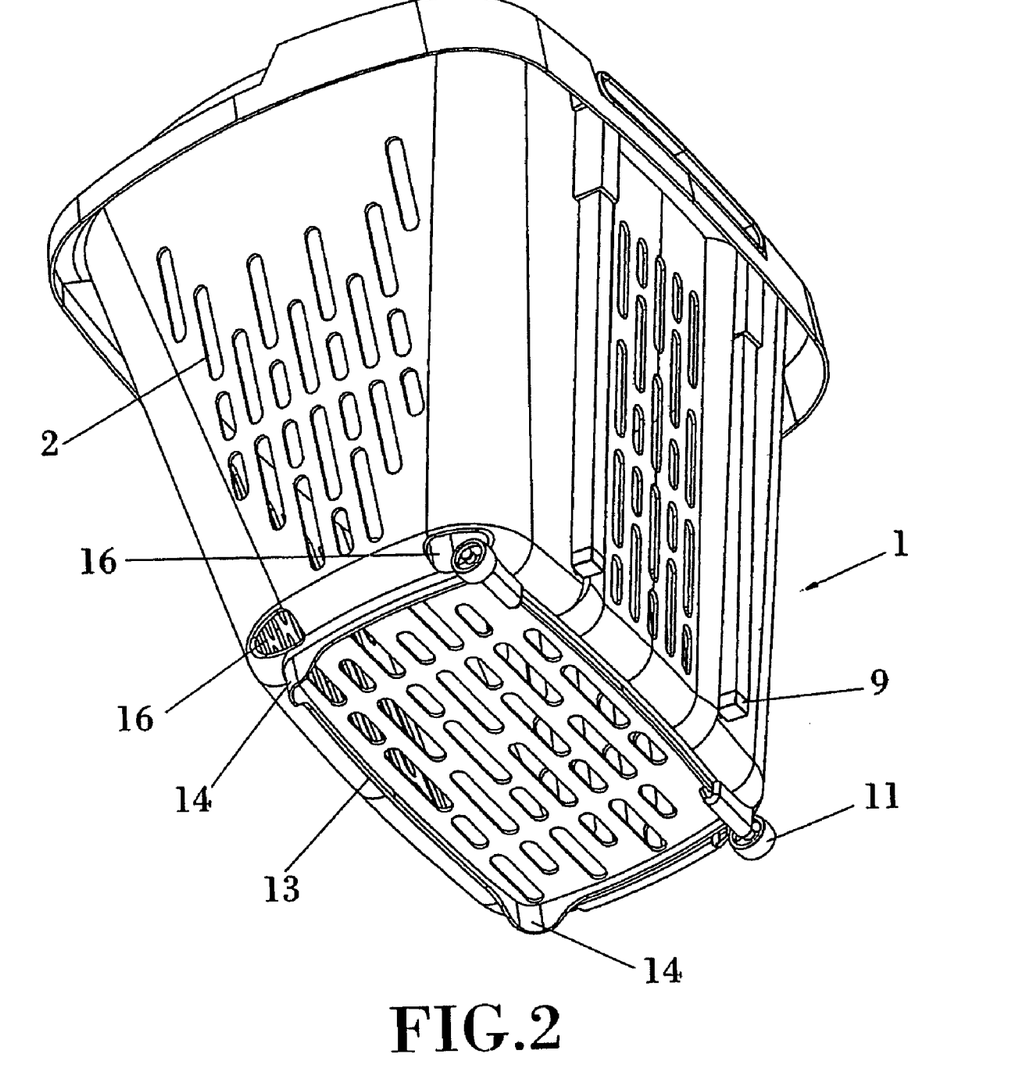
FIG. 2 shows a bottom perspective view of the improved stackable basket showing both the rear part of the telescopic handle and one of the wheels allowing to transport the basket.
Figure 4:
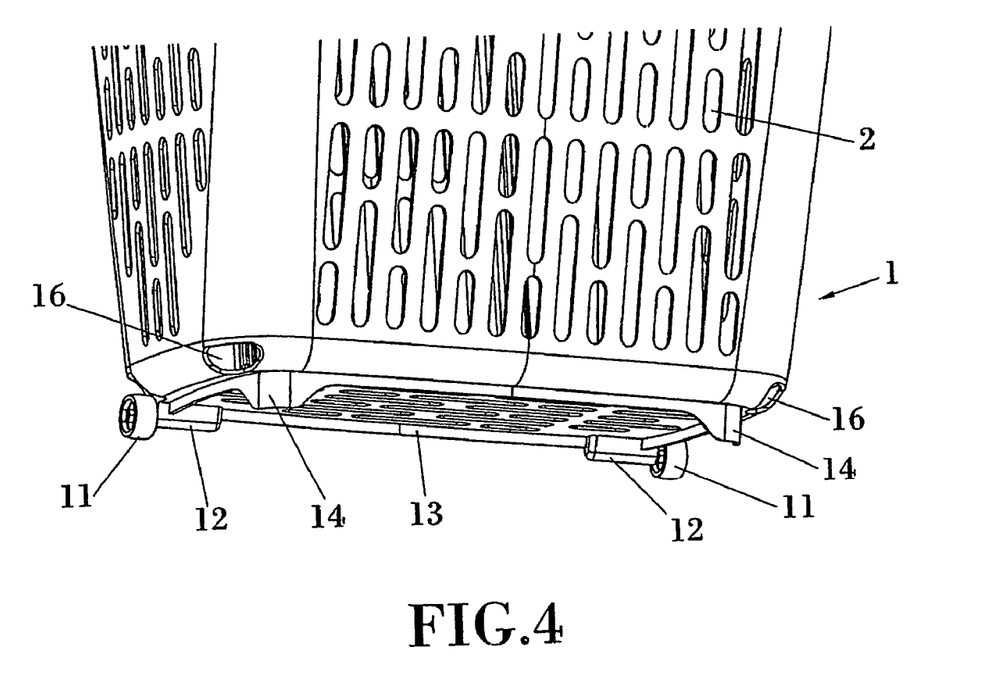
FIG. 4 shows an enlarged perspective view of the bottom part of the basket, showing both the orifices of the basket base and its legs and wheels.

The improved stackable basket (1) of the invention is completed by wheels (11) placed in correspondence with the lower vertices of the side face housing the telescopic handle (5), independent of each other so that they are not connected by an axle, the axle of each wheel instead being housed in a small protective cubicle (12) that forms part of a peripheral rib (13) placed on the bottom of the basket (1). On its other two vertices the basket has a widening that gives rise to corresponding legs or supports (14) that stabilise the basket (1) when it is placed vertically on the floor, this is, in its resting position.

Figure 3:
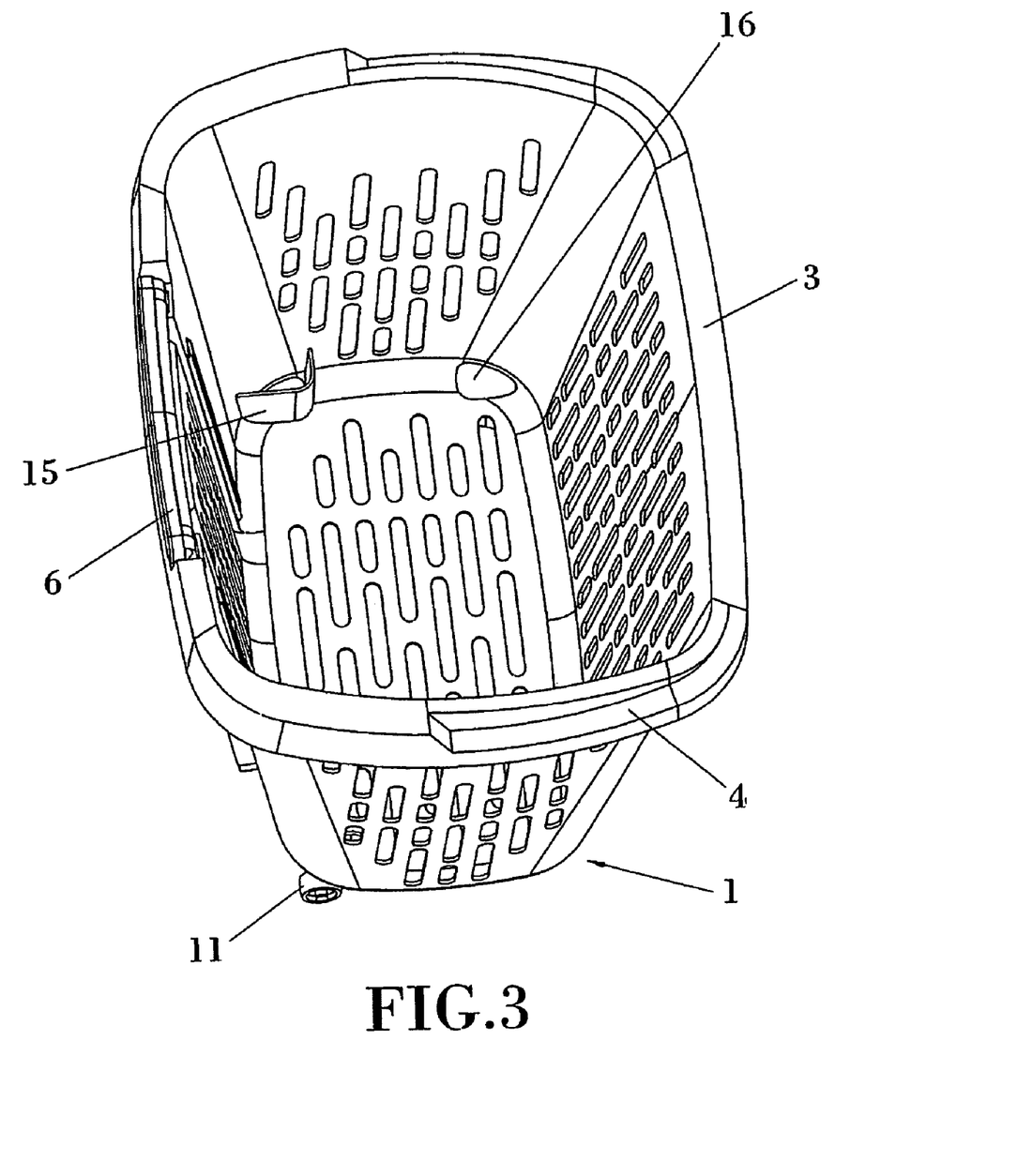
FIG. 3 shows an upper perspective view of the improved stackable basket showing both the internal walls or turrets and the orifices placed on the bottom of said basket.

Lastly, it should be remarked that as can be seen in this example of embodiment, in correspondence with the vertices under which the wheels (11) are fitted the basket (1) is internally provided, on its base, with vertical L-shaped walls or turrets (15) that define a small cubicle together with the basket walls. In addition, the example represented in the figures shows a possible embodiment in which each of the four bottom vertices of the basket has a through orifice (16) which will be framed by the vertical turrets or walls (15) in the vertices that are provided with such.

Figure 6:
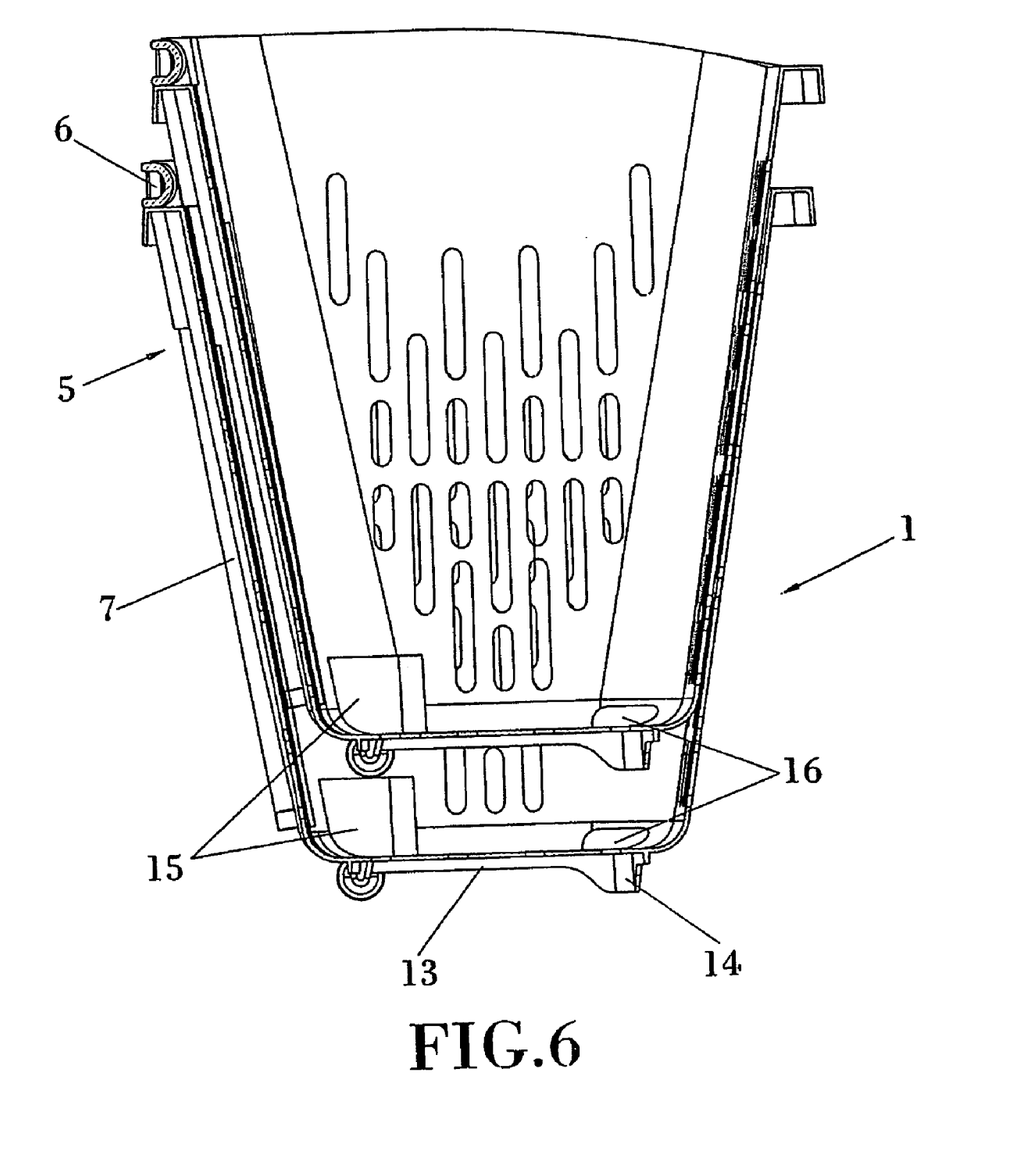
FIG. 6 shows a side view of the improved stackable basket showing one basket stacked on another, as well as the position of the wheels on the interior walls or turrets.

In this way when the dirt of the wheels (11) of the basket (1) placed on top falls, it will not be deposited on the base of the basket below it but instead will fall to the ground through the orifices defined by the walls (15) and the orifices (16).

As described above, the characteristics of the improved stackable basket (1) of this invention provide great improvements in the comfort and handling of this type of baskets, while allowing to stack them and guaranteeing the required hygiene.

The invention claimed is:

1. Improved nestable basket of the type used in self-service shops or supermarkets, the basket comprising:
    a single body generally prismatic in shape and having a plurality of side faces and a base, the body being made of a strong material and having a an upper edge on each of the plurality of side faces;
    a number of orifices or incuts in one of the plurality of side faces;
    one or more hinged handles integrated in the upper edge;
    a plurality of wheels on its base;
    a telescopic handle (5) placed on a first face of the side faces of the basket (1) that allows a user to transport it in a simple and comfortable manner;
    a plurality of openings in the base, each of the plurality of openings being proximal to a respective corner formed by two faces and being sized to have at least one dimension approximate to a diameter of one of the wheels;
    wherein when a portion of a second improved nestable basket is nested in the body a plurality of wheels from the second basket are arranged in the body so that dirt from one wheel of the plurality of wheels of the second basket pass through at least one opening of the plurality of openings;
    wherein the body comprises a shape to permit the second basket to be received in at least two positions for easy storage, the first position being that the respective first faces are disposed proximal to each other and the second position being that the respective first faces are opposite each other.

2. Improved nestable basket (1) as claimed in claim 1, characterised in that the telescopic handle (5) is placed abutting the outer wall of one of the faces of the basket (1).

3. Improved nestable basket (1) as claimed in claim 1, characterised in that the telescopic handle (5) is placed abutting the inner wall of one of the faces of the basket (1).

4. Improved nestable basket (1) as claimed in claim 1, characterised in that the face of the basket (1) on which the telescopic handle (5) is placed is provided with guide rails (8) along which run the sliders (9) by way of stops that are provided in the corresponding telescopic segments (7) of the handle (5) in its lower end, limiting the vertical displacement of the first portion of said telescopic segments (7) and preventing possible swivelling or lateral movements or these segments.

5. Improved nestable basket (1) as claimed in claim 4, characterised in that one either side of the rail (8) is a protecting longitudinal protrusion (10) to prevent the obstruction of said rail (8) and impacts or interference with the sliders (9) acting as stops.

6. Improved nestable basket (1) as claimed in claim 1, characterised in that the telescopic handle (5) is placed inside one of the faces of the basket (1).

7. Improved nestable basket (1) as claimed in claim 2 characterised in that the telescopic handle (5) is placed in one of the greater faces of the basket (1).

8. Improved nestable basket (1) as claimed in claim 1, characterised in that the telescopic handle (5), in its folded position, is fully integrated in the body of the basket (1), the grip (6) of said handle (5) being housed in the upper frame of the basket to facilitate stacking.

9. Improved nestable basket (1) as claimed in claim 1, characterised in that the carrier end of the grip (6) of the telescopic handle (5) can be folded.

10. Improved nestable basket (1) as claimed in claim 1, characterised in that the wheels (11) are placed in correspondence with the lower vertices of the face housing the telescopic handle (5) and in that the wheels are independent of each other.

11. Improved nestable basket (1) as claimed in claim 1, characterised in that the basket (1) is provided on its base with a peripheral rib (13) with two of its vertices having a widening that gives rise to corresponding legs or supports (14) that stabilise the basket (1) when it is placed vertically on the floor.

12. Improved nestable basket of the type used in self-service shops or supermarkets, the basket comprising:
    a generally prism-shaped single body made of a strong material, the body having a plurality of faces and a base;
    a plurality of incuts in one of the plurality of faces;
    a telescoping handle associated with a first face of the plurality of faces, the telescoping handle provided on an upper part of the body;
    a plurality of wheels placed on the base in a position proximal to the first face of the plurality of faces,
    a plurality of openings in the base, each of the plurality of openings being proximal to a respective corner formed by two faces and being sized to have at least one dimension approximate to a diameter of one of the wheels;
    wherein when a portion of a second improved nestable basket is nested in the body a plurality of wheels from the second basket are arranged in the body so that dirt from one wheel of the plurality of wheels of the second basket pass through at least one opening of the plurality of openings;
    wherein the body comprises a shape to permit the second basket to be received in at least two positions for easy storage, the first position being that the respective first faces are disposed proximal to each other and the second position being that the respective first faces are opposite each other.

13. Improved nestable basket (1) as claimed in claim 12, characterised in that at least each of the lower vertices of the basket (1) where the latter is provided with the aforementioned vertical walls or turrets (15) has a small through orifice (16), in which case these orifices (16) will be framed by the cubicle formed by said walls (15) and the walls of the basket (1).

14. A nesting basket comprising:
    a floor and a plurality of faces arranged in a prismatic shape, the faces being spaced apart and adapted for holding consumer goods sold in supermarkets and the like;
    a plurality of incuts in one of the faces;
    an upper and a lower edge in one of the faces, a handle integrated in the upper edge and a wheel associated with the lower edge;

wherein the handle is a telescopic handle adapted to permit a user to transport the basket in a simple and comfortable manner, the handle being associated with a first face;

a plurality of openings in the floor, each of the plurality of openings being proximal to a respective corner formed by two faces and being sized to have at least one dimension approximate to a diameter of one of the wheels;

wherein when a portion of a second improved nestable basket is nested in the body a plurality of wheels from the second basket are arranged in the body so that dirt from one wheel of the plurality of wheels of the second basket pass through at least one opening of the plurality of openings;

wherein the body comprises a shape to permit the second basket to be received in at least two positions for easy storage, the first position being that the respective first faces are disposed proximal to each other and the second position being that the respective first faces are opposite each other.

15. A shopping basket comprising:

a body having an inner space defined by a base and a plurality of flared upright walls for receiving consumer goods via an open top, the plurality of walls generally defining a top edge, a first wall of the plurality of walls comprising a plurality of orifices;

a pair of wheels mounted to an exterior surface of the base proximal to a second wall of the plurality of walls;

a telescoping handle for use by differently sized shoppers to roll the basket on the wheels, the telescoping handle associated with the second wall of the plurality and comprising a grip, the grip stored in a first notch of the top edge;

a hinged handle for carrying the basket, the hinged handle stored in a second notch in the top edge away;

wherein when the hinged handle and the grip are stored, the present basket is nestable in an inner space of a first like shopping basket and a second like shopping basket is nestable in the inner space of the basket regardless whether the second wall is aligned with a respective second wall of one of the first and second like shopping basket for permitting the shoppers to stack the present basket without a concern of orienting the present basket properly with any other like shopping basket;

wherein the base comprises a first and a second passage disposed respectively above the wheel, the first and second passages comprising substantially a size in one direction of a diameter of one wheel of the pair of wheels, the first and second passage for passing dirt of a pair of wheels of the second shopping basket through the present basket when the second wall of the present basket and the second wall of the second like shopping basket are adjacent.

16. The shopping basket of claim 15, wherein the base comprises a third and fourth passage, the third and fourth passages comprising substantially a size in one direction of a diameter of one wheel of the pair of wheels, the third and fourth passage for passing dirt of a pair of wheels of the second shopping basket through the present basket when the second wall of the present basket and the second wall of the second like shopping basket are adjacent.

17. The shopping basket of claim 15, further comprising a leg disposed on the base to space the base from a support surface when the basket is in a rest position.

18. The shopping basket of claim 15, further comprising a first and second inner wall upright from the base, the first inner wall associated with the first passage and the second inner wall associated with the second passage for preventing dirt of the pair of wheels of the second shopping basket from inadvertently depositing on the base of the present basket when the second wall of the present basket and the second wall of the second like shopping basket are adjacent.

* * * * *

UNITED STATES PATENT AND TRADEMARK OFFICE
CERTIFICATE OF CORRECTION

PATENT NO. : 7,431,312 B2
APPLICATION NO. : 11/054419
DATED : October 7, 2008
INVENTOR(S) : Sebastian et al.

It is certified that error appears in the above-identified patent and that said Letters Patent is hereby corrected as shown below:

Title Page item 73

"Araven SA, Zaragozo, ES" ................... should read --Araven SL, Zaragoza ES--

Signed and Sealed this

Eighteenth Day of November, 2008

JON W. DUDAS
*Director of the United States Patent and Trademark Office*